INVENTORS
Robert A. Chapellier
Irving Rogers
BY Eldon H. Luther
ATTORNEY

United States Patent Office 2,990,356
Patented June 27, 1961

2,990,356
CONTROL ROD DRIVE
Robert A. Chapellier, Whitestone, N.Y., and Irving Rogers, Cliffside Park, N.J., assignors, by mesne assignments, to the United States of America as represented by the United States Atomic Energy Commission
Filed Dec. 31, 1956, Ser. No. 631,767
4 Claims. (Cl. 204—193.2)

This invention relates to drive mechanism for obtaining a linear motion and has particular relation to a drive mechanism for the control rod of a nuclear reactor.

In normal operation the control rods of a reactor are moved rather slowly into and out of the reactor core to change the power level of the reactor as required. It is necessary, however, to be able to rapidly scram the control rods or move them to their innermost position in the reactor core in the event of an emergency in order to quickly shut down the reactor. Therefore the drive for the control rods must be capable of providing the required movement of the rods to accurately position them during normal operation and also to provide the necessary quick action for scramming.

In the present invention the control rod is normally driven and accurately positioned by means of an electric motor drive while the scramming operation is produced through a hydraulic drive that is entirely independent of the action of the electric drive mechanism.

Briefly stated, the invention comprises a reactor vessel containing a pressurized reactor coolant and upwardly from which extends a cylindrical housing that is open to the reactor vessel. In this housing there is provided an electric motor which is effective to axially move the control rod in the reactor vessel to accurately position the same during normal operation of the reactor. This motor is interconnected with the control rod through a pair of separable pistons contained in the housing in coaxial relation therewith, with one of these pistons being connected with the control rod and with the other being interconnected with and driven by the electric motor through a suitable mechanical interconnection. These two pistons are urged into engagement with each other through the application of hydraulic pressure to the pistons in a manner such that when in engagement the forces on the pistons produced by this hydraulic pressure are in balance. The pistons are constructed and arranged so that a common fluid pressure source exteriorly of the reactor vessel and at a higher pressure than the pressure in the reactor vessel may be applied to the pistons to urge them into engagement and at the same time the pressurized fluid in the reactor vessel may be applied to the pistons in opposition to this high pressure fluid tending to urge the pistons apart. The effective unbalanced areas over which these pressures are applied to each of the pistons is equal so that, because of the higher value of the pressure urging the pistons into engagement, there is a net resultant force which retains the pistons in their engaged position. This is the only effect of the hydraulic forces thus applied to the piston with all the forces being in balance when the pistons are in engagement and with the electric motor merely driving the control rod through these pistons which effectively interconnect the control rods with this electric motor drive for normal operation of the reactor.

When it is desired to scram the control rod however, the electric motor is completely by-passed and the scram operation is effected hydraulically. It is then merely necessary to relieve the high pressure fluid source that is applied to the piston connected to the control rod thereby permitting the reactor fluid which is applied to this piston in opposition to the now relieved high pressure fluid to move the control rod rapidly into the core of the reactor.

It is an object of this invention to provide an improved control rod drive wherein the control rod is positioned during normal operation of the reactor through one driving device and is scrammed in response to another driving device.

Another object of this invention is to provide a composite control rod drive wherein the control rod is normally positioned through a mechanically actuated drive mechanism and is scrammed by means of a hydraulic drive response to the fluid pressure within the reactor vessel.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein.

Figures 1, 2:
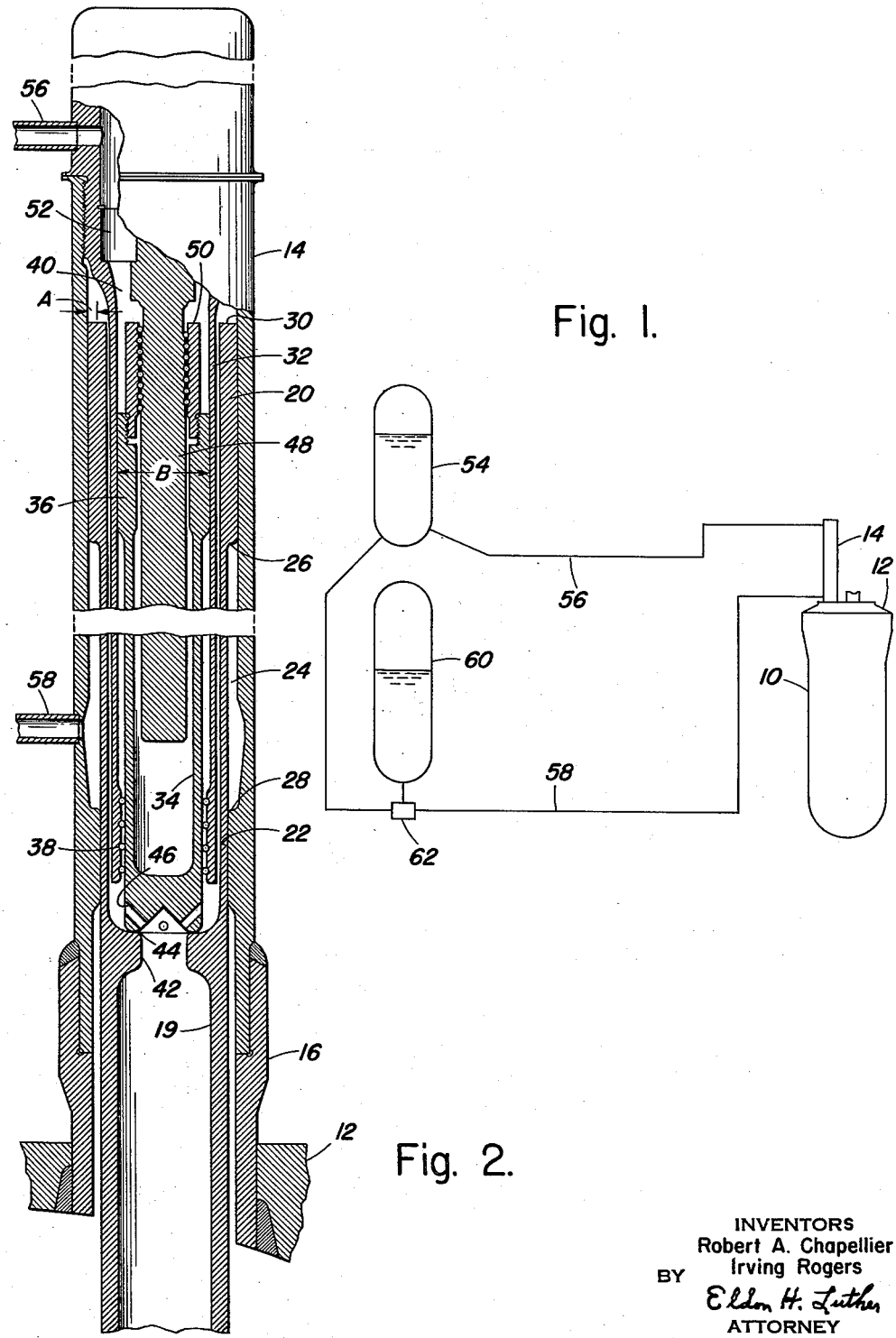
FIG. 1 is a diagrammatic view of the invention showing the control rod drive extending upwardly from the cover of a reactor vessel and showing the external pressure system as well as the containment tank employed for scramming purposes.
FIG. 2 is an enlarged detailed transverse sectional view of the control rod drive.

Referring now to the drawings, wherein like reference characters are used throughout to designate like elements, there is shown therein an illustrative and preferred embodiment of the invention which includes nuclear reactor vessel 10 of type having a pressurized coolant contained therein and surrounding a suitable core, with the level of power output being controlled by means of control rods movable into and out of this core. Extending upwardly from the cover or closure 12 at the upper end of vessel 10 is cylindrical housing 14 which is received within and welded to nozzle 16 and is open to the interior of the reactor vessel.

Positioned within housing 14 in coaxial relation therewith is the sleeve type piston 19 which extends downward into the reactor vessel and is connected to or is an extension of a control rod, not shown. The upper or outer end of piston 19 is enlarged at 20 as shown and is in loose sliding engagement with the inner wall of housing 14. Below or inwardly of this enlarged head portion 20 of piston 19, the housing 14 is formed with a gland portion 22 which is also in loose sliding engagement with this piston. Thus when piston 19 is in a position such as shown in FIG. 2 where head portion 20 is spaced outwardly of gland 22 there is formed an annular chamber 24 bounded on its outer or upper end by shoulder 26 formed on the piston 19 and at its inner end by shoulder 28 formed by gland 22. When fluid pressure is admitted to the chamber 24 it will act against the area of shoulder 26 to move piston 19 in an outward direction. Since piston 19 is in the form of a sleeve the system pressure of the reactor, or in other words, the pressurized cooling fluid, is admitted upwardly through this sleeve for its entire length and acts against the upper or outward end face 30 of the piston. Thus the force produced by a pressure in chamber 24 acting against shoulder 26 would be opposed by the force produced by the system pressure acting against the end face 30 of piston 19. The area, or effective area of the face on which this pressure will act to oppose the force exerted against shoulder 26 is equal only to the area of this shoulder since the remaining end face areas of the piston will be in counterbalancing relation. That is to say, the forces exerted by the system pressure acting against the remaining end face areas will be counterbalanced. Thus the force on piston 19, created by the application of pressure to chamber 24 is in opposition to the force created by the application of the reactor system pressure to the annular portion of end face 30 identified as A in FIG. 2 and which has an area equal to that of shoulder 26.

The housing 14 is provided at its upper end with cylindrical sleeve 32 which extends downwardly into piston 19 in spaced telescoping relation with this piston. Within this sleeve 32 is mounted drive piston 34 which has an enlarged outer end 36 in loose sliding engagement with this sleeve. Linear spline ball bearings 38 are interposed between the inner end of the periphery of this piston and the inner end of sleeve 32 to guide the piston during its reciprocal movement while at the same time permitting the free flow of the reactor coolant fluid about piston 34 and into contact with its enlarged outer end 36. The sleeve 32 and piston 34 effectively form a chamber, designated 40 on the drawings, at the upper or outer end of housing 14. Chamber 40 is separate from the remaining or lower interior portion of the housing and the internal diameter B of sleeve 32 is such that the area of this sleeve and accordingly the effective piston area of drive piston 34 is equal to the area of shoulder 26 formed on piston 19 so that a pressure admitted to chamber 40 will urge the drive piston 34 inwardly and if an equal pressure is admitted to chamber 24 the pistons 19 and 34 will be urged in opposing directions with equal force.

The effective area over which a pressure in chamber 40 will act on piston 34 to urge it inwardly is equal to the effective area of this piston over which the reactor system pressure will act to move the piston outwardly since the pressure in chamber 40 acts against one side of this piston while the reactor system pressure acts against the other side.

Inward movement of drive piston 34 relative to sleeve type piston 19 is limited by the radially inwardly extending abutment 42 formed on piston 19 and lying within the path of piston 34 so that the nose 44 of this piston engages this abutment. This nose portion is provided with bores 46 to insure the free passage of reactor coolant fluid there past.

With this construction, if a pressure is admitted to chambers 24 and 40 which is higher than the reactor system pressure, piston 34 will have a resultant force acting on it tending to move in inwardly while piston 19 will have a similar resultant force acting on it tending to move it outwardly. These forces will be effective to move these pistons relative to each other until nose 44 of piston 34 engages abutment 42 of piston 19 and thereafter the two resultant forces will counterbalance each other and the pistons will merely be retained in engagement with a force equal to twice the resultant force acting on each piston. When this situation prevails, if drive piston 34 were moved axially on sleeve 32 by a mechanical drive mechanism, piston 19 will move in unison with this drive piston and accordingly the control rod may be positioned as desired.

Such a drive is provided for piston 34 by means of the elongated, screw-threaded drive member or lead screw 48 which extends downwardly into the interior of piston 34 and is engaged by a ball nut 50 which is secured to the outer end of piston 34. The upper or outer end of lead screw 48 is driven by a motor 52, which is preferably of the so-called canned motor type, contained within the upper end of housing 14 with such a motor being preferred because it requires no shafts to extend through its housing and thereby positively prevents fluid leakage as a result of such shaft extensions. Piston 34 is prevented from rotating by means of ball bearings 38 which are received within suitable longitudinally extending grooves at the periphery of the piston and within suitable sockets in the inner surface of sleeve 32 so that they accordingly act as splines. Thus as shaft 48 is rotated by motor 52 piston 34 will move axially on sleeve 32.

In order to normally retain pistons 34 and 19 in engagement, as shown in FIG. 2, a pressure source is provided exteriorly of the reactor vessel with this source being at a higher pressure than the coolant within the reactor, or in other words, the system reactor pressure. As embodied, this exterior pressure source is contained in pressure vessel 54 and is supplied to chamber 40 and chamber 24 through conduits 56 and 58 respectively. With this high pressure from vessel 54 supplied to chambers 40 and 24 the pistons 34 and 19 will be urged into engagement and accordingly, as piston 34 is driven through electric motor 52 and lead screw 48 the control rod in the reactor will be moved and may be accurately positioned to regulate the power level of the reactor as is desired in normal operation of the reactor. When it is desired to scram the control rod, the pressure in chamber 24 is independently relieved relative to the other pressures acting upon the control rod drive thereby permitting the then unbalanced pressure acting against the face 30 of piston 19 to rapidly move this piston inward to its extreme position where shoulder 28 contacts shoulder 26 and the control rod is completely inserted into the core of the reactor thereby shutting down the reactor.

In order to independently relieve the pressure supplied to chamber 24 from vessel 54 there is provided in conduit 58 a three way valve 62 which is effective to shut off communication of chamber 24 with pressure vessel 54 and establish communication between the chamber and scram containment vessel 60 into which the pressure from chamber 24 may then be bled. The valve 62 will of course normally be in position whereby vessel 54 is in communication with chamber 24 with vessel 60 being in its aforementioned state only when scramming of the control rod is necessary.

The temperature of the reactor coolant will normally be rather high and the loose fit of piston 19 in housing 14 and piston 34 in sleeve 32 is such as to provide for a controlled rate of leakage of the high pressure fluid from chambers 24 and 40 in order to cool the elements of the control rod drive.

While we have illustrated and described a preferred embodiment of our invention it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What we claim is:

1. In a nuclear reactor, a reactor vessel having a cooling fluid under pressure therewithin, a control rod drive assembly including a hollow cylindrical housing extending outwardly from and open into said vessel, a first piston having a passageway extending therethrough to form a hollow sleeve coaxial with and slidably received in said housing and forming with the housing an annular first chamber, an expanded section on the outer edge of said first piston making slidable contact with the inside surface of said housing, an annular shoulder on the inside of said cylindrical housing making slidable contact with the outside surface of said first piston, said annular chamber being bounded on its outer end by said piston expanded section and on its inner end by said housing annular shoulder, a hollow sleeve telescoping into the outer end of the first piston in spaced relation therewith and secured to the housing in a fluid-tight manner outwardly of said first piston, a second piston slidably disposed in said sleeve, an annular abutment on the inside wall of said first piston and located inwardly of said second piston, said second piston arranged for abutting engagement with said abutment and having a cylindrical wall extending outwardly effectively forming outwardly of said second piston a second chamber, the effective pressure bearing area of said second piston exposed to said second chamber being equal to the area of said first piston that bounds the outer end of said annular first chamber and facing oppositely, a source of fluid outside of said reactor and under a pressure greater than that of the reactor cooling fluid, and means conveying the same to said chambers whereby equal forces are created urging the pistons into said engagement in said housing, said pistons each having equal and oppositely disposed surfaces bearing the pressure of the reactor cooling fluid, each said oppositely disposed surface being also opposite to a corresponding piston area bearing the pressure of said fluid source, the pressure on the oppositely disposed surfaces and areas normally maintaining said pistons in engagement, motor means operative to move said second piston axially of the housing thereby accurately positioning both said pistons movably together, and control means for independently releasing the fluid pressure from said annular first chamber thereby releasing said first piston from engagement with said second piston.

2. The combination with a housing therefor of hollow first piston means therein having a first shoulder area exposed to a first pressurized fluid acting to move said first piston means in a first axial direction, a second shoulder area exposed to a second pressurized fluid acting to move said first piston means in a second axial direction opposite to that of said first axial direction with the force on said first piston means due to said first pressurized fluid normally exceeding that of said second pressurized fluid, and an internal abutment a second hollow piston means within said first piston means and slidable in said first and second axial directions and coming into abutting engagement with said first piston means internal abutment, at some predetermined position with respect to said first piston means in said first axial direction, motor means for selectively positioning in either axial direction said second piston means in said housing with said first piston means normally in engagement therewith due to the superior force thereon of said first pressurized fluid over that of said second pressurized fluid, means for exerting a net force on said second piston means in the second direction to balance the force due to said first piston means in the first direction for minimizing the load on said motor means, and means for selectively relieving said first area of said first pressurized fluid causing disengagement of said piston means from each other by movement of said first piston means in said second axial direction away from said second piston means under the force of said second pressurized fluid on said second area.

3. The device defined in claim 2 wherein said motor means includes an electric motor disposed in said housing.

4. The combination of a vessel containing a pressurized working fluid, a source of fluid pressure higher than the working fluid pressure, a housing extending from said vessel, first piston means within said housing having first and second effective areas, means exposing said first effective area to said working fluid for urging said first piston means inwardly toward said vessel and means exposing said second effective area to said source of fluid pressure for urging said first piston means outwardly away from said vessel, said first and second effective areas being equal to each other, causing a net outward force on said first piston means, second piston means within said housing resisting the outward movement of said first piston means by contact therewith, motor means for adjusting the position of said second piston means thereby effectively positioning said first piston means, said second piston means having first and second effective areas equal to said first piston means effective areas, respectively, means isolating the second effective area of the first piston from the first effective area of the second piston, means exposing said second piston means first effective area to said source of fluid pressure for urging said second piston means inwardly in opposition to said first piston means, means exposing said second piston means second effective area to said working fluid for urging said second piston means outwardly, the net inward moving force on said second piston means being thereby substantially equal to the net outward force on said first piston means and effectively minimizing the load on said motor means, and selective means to release the pressure applied to the second effective area of said first piston means thereby to cause the unrestrained inward movement of said first piston means.

References Cited in the file of this patent

UNITED STATES PATENTS

| | | |
|---|---|---|
| 2,660,029 | Geyer | Nov. 24, 1953 |
| 2,764,131 | Knights | Sept. 25, 1956 |

OTHER REFERENCES

AECD–3668, Atomic Energy Commission document dated August 17, 1955; pages 13, 14, 44.